United States Patent
Kitaura et al.

(10) Patent No.: US 9,599,055 B2
(45) Date of Patent: Mar. 21, 2017

(54) EXHAUST GAS PURIFICATION APPARATUS FOR AN INTERNAL COMBUSTION ENGINE

(71) Applicants: Toyota Jidosha Kabushiki Kaisha, Toyota-shi, Aichi-ken (JP); Denso Corporation, Kariya-shi, Aichi-ken (JP)

(72) Inventors: Koichi Kitaura, Odawara (JP); Yasushi Iwazaki, Ebina (JP); Masahiro Kubo, Kariya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 0 days.

(21) Appl. No.: 14/804,897

(22) Filed: Jul. 21, 2015

(65) Prior Publication Data

US 2016/0025026 A1 Jan. 28, 2016

(30) Foreign Application Priority Data

Jul. 23, 2014 (JP) ................................. 2014-149884

(51) Int. Cl.
*F01N 11/00* (2006.01)
*F02D 41/14* (2006.01)
(Continued)

(52) U.S. Cl.
CPC ......... *F02D 41/1439* (2013.01); *F01N 3/101* (2013.01); *F01N 11/007* (2013.01); *F02B 77/086* (2013.01); *F02D 41/1454* (2013.01); *F02D 41/1461* (2013.01); *F01N 2550/02* (2013.01); *F02D 41/024* (2013.01); *Y02T 10/22* (2013.01)

(58) Field of Classification Search
CPC .... F01N 3/101; F01N 3/0885; F01N 2260/04; F01N 2560/026; F01N 2900/1612; F02D 41/1463; Y02T 10/22
See application file for complete search history.

(56) References Cited

U.S. PATENT DOCUMENTS

2003/0041591 A1    3/2003  Kuroda et al.

FOREIGN PATENT DOCUMENTS

JP          09125937 A   *  5/1997
JP       2003-065039 A      3/2003
(Continued)

OTHER PUBLICATIONS

Machine translation of JPH09125937A, accessed on Jul. 28, 2016.*

Primary Examiner — Jonathan Matthias
(74) Attorney, Agent, or Firm — Dinsmore & Shohl LLP (57) ABSTRACT

The sulfur poisoning of a three-way catalyst is intended to be detected with a high degree of accuracy. It is determined whether the sulfur poisoning of the three-way catalyst is made to be recovered, or a determination is made that the degree of sulfur poisoning of the three-way catalyst is higher when the concentration of NOx detected by an NOx sensor is high than when it is low, based on the concentration of NOx downstream of the three-way catalyst after the air fuel ratio of the exhaust gas flowing into the three-way catalyst has been made to change from a rich air fuel ratio to a lean air fuel ratio and before the air fuel ratio of the exhaust gas flowing out of the three-way catalyst changes to a lean air fuel ratio.

4 Claims, 5 Drawing Sheets

(51) Int. Cl.
*F01N 3/10* (2006.01)
*F02B 77/08* (2006.01)
*F02D 41/02* (2006.01)

(56) References Cited

FOREIGN PATENT DOCUMENTS

| | | |
|---|---|---|
| JP | 2010-043624 A | 2/2010 |
| JP | 2010-163885 A | 7/2010 |
| JP | 2014-005797 A | 1/2014 |

\* cited by examiner

EXHAUST GAS PURIFICATION APPARATUS FOR AN INTERNAL COMBUSTION ENGINE

CROSS REFERENCE TO RELATED APPLICATIONS

This application claims priority to Japanese Patent Application No. 2014-149884 filed on Jul. 23, 2014, the entire contents of which are incorporated by reference herein.

BACKGROUND OF THE INVENTION

Field of the Invention

The present invention relates to an exhaust gas purification apparatus for an internal combustion engine.

Description of the Related Art

There has been known a method of diagnosing deterioration of a three-way catalyst (a so-called Cmax method), by performing active control to switch the air fuel ratio of exhaust gas between a rich air fuel ratio and a lean air fuel ratio in an alternate manner, and measuring a maximum storage amount of oxygen (Cmax) stored in the three-way catalyst (for example, refer to a first patent literature). Here, the maximum storage amount of oxygen in the three-way catalyst is related to a period of time and an air fuel ratio of exhaust gas, from the time when the air fuel ratio of exhaust gas flowing into the three-way catalyst has changed from a rich air fuel ratio to a lean air fuel ratio until the time when the air fuel ratio of exhaust gas flowing out of the three-way catalyst changes to a lean air fuel ratio. Similarly, the maximum storage amount of oxygen in the three-way catalyst is also related to a period of time and an air fuel ratio of exhaust gas, from the time when the air fuel ratio of exhaust gas flowing into the three-way catalyst has changed from the lean air fuel ratio to the rich air fuel ratio until the time when the air fuel ratio of exhaust gas flowing out of the three-way catalyst changes to a rich air fuel ratio. Accordingly, the maximum storage amount of oxygen in the three-way catalyst can be calculated based on these periods of time and air fuel ratios.

According to this Cmax method, for example, in cases where the maximum storage amount of oxygen in the three-way catalyst becomes smaller than a threshold value, a determination is made that the three-way catalyst has deteriorated. This deterioration is unrecoverable deterioration, and is thermal deterioration, for example.

PRIOR ART REFERENCES

Patent Literatures

[First Patent Literature] Japanese patent laid-open publication No. 2010-043624
[Second Patent Literature] Japanese patent laid-open publication No. 2010-163885
[Third Patent Literature] Japanese patent laid-open publication No. 2014-005797
[Fourth Patent Literature] Japanese patent laid-open publication No. 2003-065039

SUMMARY OF THE INVENTION

However, when sulfur poisoning occurs in the three-way catalyst, the release rate or speed of oxygen in the three-way catalyst decreases, so the maximum storage amount of oxygen in the three-way catalyst obtained by the above-mentioned Cmax method decreases apparently. Accordingly, when the determination of the deterioration of the three-way catalyst is carried out in a state where the degree of sulfur poisoning of the three-way catalyst is high, a determination may be made that the three-way catalyst has deteriorated, though not actually deteriorated. Because sulfur poisoning can be recovered by carrying out sulfur poisoning recovery control, it is desirable to distinguish the sulfur poisoning from unrecoverable deterioration such as thermal deterioration.

The present invention has been made in view of the problem as mentioned above, and the object of the invention is to detect sulfur poisoning of a three-way catalyst at a high degree of accuracy.

In order to achieve the above-mentioned object, an exhaust gas purification apparatus for an internal combustion engine according to the present invention comprises:

a three-way catalyst that is arranged in an exhaust passage of the internal combustion engine, and has an oxygen storage ability;

an NOx sensor that is arranged in the exhaust passage at a location downstream of said three-way catalyst, and configured to detect a concentration of NOx in exhaust gas;

an air fuel ratio sensor that is arranged in the exhaust passage at a location downstream of said three-way catalyst, and configured to detect an air fuel ratio of the exhaust gas;

an air fuel ratio control unit configured to change the air fuel ratio of the exhaust gas flowing into said three-way catalyst; and a determination unit configured to determine whether sulfur poisoning of said three-way catalyst is made to be recovered, or make a determination that the degree of sulfur poisoning of said three-way catalyst is higher when the concentration of NOx detected by said NOx sensor is high than when it is low, based on the concentration of NOx detected by said NOx sensor after the air fuel ratio of the exhaust gas has been changed from a rich air fuel ratio to a lean air fuel ratio by means of said air fuel ratio control unit and before the air fuel ratio detected by said air fuel ratio sensor changes to a lean air fuel ratio.

The three-way catalyst is composed of a catalyst which has an oxygen storage ability, and in which poisoning is caused by sulfur components in fuel. When the air fuel ratio of the exhaust gas flowing into the three-way catalyst changes from a rich air fuel ratio to a lean air fuel ratio, oxygen is stored in the three-way catalyst. During the time oxygen is being stored in the three-way catalyst, the air fuel ratio of the exhaust gas flowing out of the three-way catalyst becomes substantially a stoichiometric air fuel ratio. That is, in a period of time after the air fuel ratio of the exhaust gas flowing into the three-way catalyst has changed from a rich air fuel ratio to a lean air fuel ratio and before the air fuel ratio of the exhaust gas flowing out of the three-way catalyst changes to a lean air fuel ratio (i.e., hereinafter, this period of time being also referred to as a pre-inversion period of time), oxygen is in the course of being stored in the three-way catalyst.

Said air fuel ratio control unit changes the air fuel ratio of the exhaust gas flowing into the three-way catalyst from a rich air fuel ratio to a lean air fuel ratio, but instead of this, in cases where the air fuel ratio detected by the air fuel ratio sensor becomes a lean air fuel ratio, the air fuel ratio of the exhaust gas flowing into the three-way catalyst may be changed from a lean air fuel ratio to a rich air fuel ratio, and in cases where the air fuel ratio detected by the air fuel ratio sensor becomes a rich air fuel ratio, the air fuel ratio of the exhaust gas flowing into the three-way catalyst may also be changed from a rich air fuel ratio to a lean air fuel ratio.

Here, note that in the case of changing the air fuel ratio of the exhaust gas from a rich air fuel ratio to a lean air fuel ratio, the air fuel ratio of the exhaust gas is made to change to the lean air fuel ratio, while accompanied by combustion in the internal combustion engine.

Accordingly, when the above-mentioned control of the air fuel ratio is carried out by the air fuel ratio control unit, and before the air fuel ratio detected by the air fuel ratio sensor changes to a lean air fuel ratio, oxygen is in the course of being stored in the three-way catalyst. At this time, the air fuel ratio of the exhaust gas in the interior of the three-way catalyst becomes substantially the stoichiometric air fuel ratio, so NOx will be reduced when the degree of sulfur poisoning of the three-way catalyst is low. That is, NOx is hardly detected by the NOx sensor, or even if NOx is detected, the concentration of NOx is relatively low.

On the other hand, when the degree of sulfur poisoning of the three-way catalyst is high, the activity of precious or noble metal to reduce NOx in the three-way catalyst becomes low. For this reason, even if the air fuel ratio of the exhaust gas inside the three-way catalyst becomes the stoichiometric air fuel ratio, the removal or reduction rate of NOx becomes low. That is, the concentration of NOx detected by the NOx sensor becomes relatively high. This phenomenon is dominantly affected more by the influence of the sulfur poisoning of the three-way catalyst than by the thermal deterioration thereof, so it is possible to detect the sulfur poisoning of the three-way catalyst independently from the thermal deterioration thereof.

In this manner, the concentration of NOx detected by the NOx sensor in said pre-inversion period of time is in correlation with the sulfur poisoning of the three-way catalyst. Accordingly, based on the concentration of NOx detected by the NOx sensor, it is possible to determine whether the sulfur poisoning of the three-way catalyst is made to be recovered can be determined, or determine the degree of sulfur poisoning of the three-way catalyst. The concentration of NOx used at the time of carrying out said determination may be a concentration of NOx at a predetermined point in time in the pre-inversion period of time, or may also be an average value of the concentration of NOx in the pre-inversion period of time, or may also be a maximum value of the concentration of NOx in the period of time, or may also be an integrated value of the concentration of NOx in the pre-inversion of period of time.

In cases where the degree of sulfur poisoning on the three-way catalyst is high, it becomes possible to make the determination of the deterioration of the three-way catalyst while eliminating the influence of the sulfur poisoning thereof, by carrying out the determination of the deterioration of the three-way catalyst after performing sulfur poisoning recovery control, so that the accuracy of the deterioration determination can be enhanced. In addition, the higher the degree of sulfur poisoning (hereinafter, also referred to as the poisoning level) of the three-way catalyst, the lower becomes the removal or reduction rate of NOx, so the higher becomes the concentration of NOx in said pre-inversion period of time. Accordingly, a determination can be made that the higher the concentration of NOx detected by the NOx sensor, the higher becomes the degree of sulfur poisoning.

In addition, in cases where the concentration of NOx detected by said NOx sensor is equal to or higher than a concentration threshold value, after the air fuel ratio of the exhaust gas has been changed from a rich air fuel ratio to a lean air fuel ratio by means of said air fuel ratio control unit and before the air fuel ratio detected by said air fuel ratio sensor changes to a lean air fuel ratio, said determination unit can make a determination that the sulfur poisoning of said three-way catalyst is made to be recovered.

The concentration of NOx detected by the NOx sensor in said pre-inversion period of time and the degree of sulfur poisoning of the three-way catalyst are in correlation with each other. For this reason, in cases where the concentration of NOx is equal to or higher than the concentration threshold value, it is assumed that the degree of sulfur poisoning of the three-way catalyst exceeds or may exceed an allowable range, and hence, the sulfur poisoning can be recovered. That is, the concentration threshold value can be set to a concentration of NOx at which the degree of sulfur poisoning of the three-way catalyst exceeds or may exceed the allowable range. This allowable range of the degree of sulfur poisoning may also be set to a range of the degree of sulfur poisoning in which the concentration of NOx flowing out of the three-way catalyst falls within an allowable range, or may also be set to a range of the degree of sulfur poisoning in which when carrying out the determination of the deterioration of the three-way catalyst, the accuracy of the determination becomes an allowable range.

Moreover, said air fuel ratio control unit can perform air fuel ratio control in which the air fuel ratio of the exhaust gas flowing into said three-way catalyst is made to a lean air fuel ratio in cases where the air fuel ratio detected by said air fuel ratio sensor is a rich air fuel ratio, whereas the air fuel ratio of the exhaust gas flowing into the three-way catalyst is made to a rich air fuel ratio in cases where the air fuel ratio detected by said air fuel ratio sensor is a lean air fuel ratio.

Based on the concentration of NOx detected by said NOx sensor at the time of said air fuel ratio control being performed, said determination unit can determine whether sulfur poisoning of said three-way catalyst is made to be recovered, or can make a determination that the degree of sulfur poisoning of said three-way catalyst is higher when the concentration of NOx detected by said NOx sensor is high, than when it is low.

Further, said determination unit can make a determination that said three-way catalyst has deteriorated, when a maximum storage amount of oxygen in said three-way catalyst obtained by performing said air fuel ratio control is less than a storage amount threshold value, in the case where a determination has been made that it is not necessary to recover the sulfur poisoning of said three-way catalyst, or in the case where a determination has been made that the degree of sulfur poisoning of said three-way catalyst is less than a poisoning threshold value.

Said poisoning threshold value can be made to a degree of sulfur poisoning at the time when the degree of sulfur poisoning of the three-way catalyst exceeds the allowable range, or at the time when the degree of sulfur poisoning of the three-way catalyst may exceed the allowable range. Accordingly, in cases where the degree of sulfur poisoning of the three-way catalyst is less than the poisoning threshold value, the degree of sulfur poisoning falls within the allowable range. In addition, the degree of sulfur poisoning of the three-way catalyst may become the poisoning threshold value, when the concentration of NOx is said concentration threshold value. Said storage amount threshold value is a lower limit value of the allowable range of the maximum storage amount of oxygen.

By performing said air fuel ratio control, the air fuel ratio of the exhaust gas flowing into the three-way catalyst is changed from a rich air fuel ratio to a lean air fuel ratio. For this reason, there exists a period of time which is after the air fuel ratio of the exhaust gas flowing into the three-way catalyst has changed from a rich air fuel ratio to a lean air fuel ratio, and which is before the air fuel ratio detected by said air fuel ratio sensor changes to a lean air fuel ratio, in the course of said air fuel ratio control. When the concentration of NOx is detected by the NOx sensor in this period of time, based on the concentration of NOx thus detected, it can be determined whether the sulfur poisoning of said three-way catalyst is made to be recovered, or a determination can be made that the degree of sulfur poisoning of said three-way catalyst is higher when the concentration of NOx detected by said NOx sensor is high, than when it is low.

Further, by performing said air fuel ratio control, it is possible to calculate the maximum storage amount of oxygen in the three-way catalyst. As the thermal deterioration of the three-way catalyst progresses, the maximum storage amount of oxygen decreases, but the maximum storage amount of oxygen obtained by performing said air fuel ratio control also decreases apparently due to the sulfur poisoning of the three-way catalyst, too. Here, in the case where the determination has been made that it is not necessary to recover the sulfur poisoning of said three-way catalyst, or in the case where the determination has been made that the degree of sulfur poisoning of said three-way catalyst is less than the poisoning threshold value, it is considered that the influence of the sulfur poisoning of the three-way catalyst is small in the maximum storage amount of oxygen. At this time, in the case where the maximum storage amount of oxygen is small, it is considered that the maximum storage amount of oxygen has become small due to the influence of the thermal deterioration of the three-way catalyst. That is, by determining the thermal deterioration of the three-way catalyst based on the maximum storage amount of oxygen when the influence of the sulfur poisoning of the three-way catalyst is small, it is possible to enhance the accuracy of the determination.

According to the present invention, the sulfur poisoning of the three-way catalyst can be detected with a high degree of accuracy.

The above and other objects, features and advantages of the present invention will become more readily apparent to those skilled in the art from the following detailed description of a preferred embodiment of the present invention taken in conjunction with the accompanying drawings.

BEST MODE FOR CARRYING OUT THE INVENTION

Hereinafter, the best mode for carrying out the present invention will be exemplarily described in detail based on a preferred embodiment with reference to the attached drawings. However, the dimensions, materials, shapes, relative arrangements and so on of component parts described in the embodiment are not intended to limit the scope of the present invention to these alone in particular as long as there are no specific statements.

First Embodiment

Figure 1:
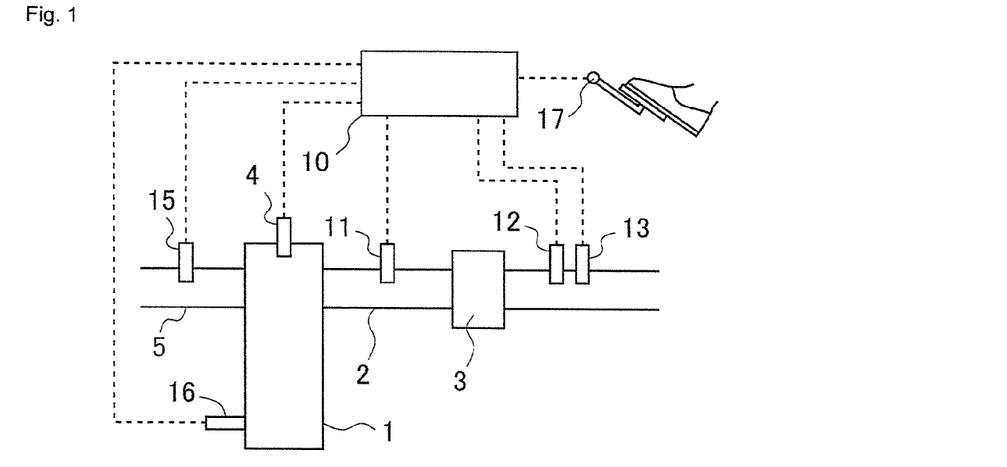
FIG. 1 is a view showing the schematic construction of an intake system and an exhaust system of an internal combustion engine according to an embodiment of the present invention.

FIG. 1 is a view showing the schematic construction of an intake system and an exhaust system of an internal combustion engine 1 according to an embodiment of the present invention. The internal combustion engine 1 is a gasoline engine for driving a vehicle. However, the internal combustion engine 1 may be a diesel engine. An exhaust passage 2 is connected to the internal combustion engine 1. A three-way catalyst 3 is arranged in the exhaust passage 2.

The three-way catalyst 3 has an oxygen storage ability, and serves to purify or remove NOx, HC and CO with a maximum efficiency at the time when a catalytic atmosphere is at a stoichiometric air fuel ratio. In addition, when the air fuel ratio of an incoming exhaust gas is a lean air fuel ratio, the three-way catalyst 3 occludes or stores an excess of oxygen, whereas when the air fuel ratio of the incoming exhaust gas is a rich air fuel ratio, the three-way catalyst 3 releases or supplies a shortage of oxygen, thereby maintaining the exhaust gas therein at the stoichiometric air fuel ratio. By the action of such an oxygen storage ability, the three-way catalyst 3 can remove or reduce HC, CO and NOx, even if the air fuel ratio of the exhaust gas flowing into the three-way catalyst 3 is other than the stoichiometric air fuel ratio.

A first air fuel ratio sensor 11 for measuring the air fuel ratio of the exhaust gas is arranged in the exhaust passage 2 at a location upstream of the three-way catalyst 3. In addition, a second air fuel ratio sensor 12 for detecting the air fuel ratio of the exhaust gas and an NOx sensor 13 for detecting the concentration of NOx in the exhaust gas are arranged in the exhaust passage 2 at locations downstream of the three-way catalyst 3. Here, note that instead of arranging the second air fuel ratio sensor 12 and the NOx sensor 13, there can be provided a single sensor which can detect both the air fuel ratio of the exhaust gas and the concentration of NOx in the exhaust gas. Another catalyst such as an NOx storage reduction catalyst (hereinafter, referred to as an NSR catalyst), etc., can also be arranged at the downstream side of the second air fuel ratio sensor 12 and the NOx sensor 13. On the other hand, between the three-way catalyst 3 and the second air fuel ratio sensor 12 and between the three-way catalyst 3 and the NOx sensor 13, there is arranged no other catalyst which affects the concentration of oxygen or the concentration of NOx in the exhaust gas. For this reason, the second air fuel ratio sensor 12 and the NOx sensor 13 serve to detect the air fuel ratio of the exhaust gas and the concentration of NOx in the exhaust gas flowing out of the three-way catalyst 3. Here, note that the first air fuel ratio sensor 11 and the second air fuel ratio sensor 12 may be limiting current type oxygen concentration sensors, for example, or may be electromotive force type (concentration cell type) oxygen concentration sensors ($O_2$ sensors), for example. Each of the limiting current type oxygen concentration sensors outputs a voltage corresponding to an air fuel ratio over a wide range of the air fuel ratio. On the other hand, each of the electromotive force type (concentration cell type) oxygen concentration sensors outputs a voltage which changes suddenly at the stoichiometric air fuel ratio. Note that in this embodiment, the second air fuel ratio sensor 12 corresponds to an air fuel ratio sensor in the present invention.

Further, on the internal combustion engine 1, there is mounted a fuel injection valve 4 for each cylinder for supplying or injecting fuel into a corresponding cylinder. Moreover, an intake passage 5 is connected to the internal combustion engine 1. An air flow meter 15 for detecting a flow rate of intake air is arranged in the intake passage 5.

Then, in the internal combustion engine 1, there is provided an electronic control unit (ECU) 10 in combination therewith. The ECU 10 controls an operating state of the internal combustion engine 1, an exhaust gas purification apparatus, and so on. A crank position sensor 16 and an accelerator opening sensor 17, in addition to the first air fuel ratio sensor 11, the second air fuel ratio sensor 12, the NOx sensor 13 and the air flow meter 15 as referred to above, are electrically connected to the ECU 10, so that the detected values of these individual sensors are passed or transmitted to the ECU 10.

The ECU 10 is able to grasp the operating state of the internal combustion engine 1, such as the engine rotation speed based on the detection of the crank position sensor 16, the engine load based on the detection of the accelerator opening sensor 17, etc. Here, note that in this embodiment, the air fuel ratio of the exhaust gas flowing into the three-way catalyst 3 is able to be detected by the first air fuel ratio sensor 11, but it is also possible to estimate the air fuel ratio of the exhaust gas based on the amount of intake air in the internal combustion engine 1 and the amount of fuel injection from each injection valve 4.

However, sulfur components contained in fuel are accumulated in the three-way catalyst 3. This is referred to as sulfur poisoning. The release speed of oxygen from the three-way catalyst 3 decreases due to this sulfur poisoning, so there is a fear that the exhaust gas purifying ability of the three-way catalyst 3 may decrease. For this reason, sulfur poisoning recovery control to recover the three-way catalyst 3 from the sulfur poisoning thereof is carried out at an appropriate time. This sulfur poisoning recovery control is carried out by making the three-way catalyst 3 to a high temperature, and at the same time by making the air fuel ratio of the exhaust gas equal to or less than the stoichiometric air fuel ratio. In order to make the three-way catalyst 3 to the high temperature, for example, the ignition timing of the internal combustion engine 1 is retarded, or the valve opening time of an exhaust valve of each cylinder in the internal combustion engine 1 is advanced, or the opening and closing of one of two exhaust valves are stopped in the case of the two exhaust valves being provided for each cylinder, or in the case of a plurality of cylinders being provided, reduced cylinder operation is carried out by stopping combustion in a part of the plurality of cylinders, or in the case of the internal combustion engine 1 being mounted on a hybrid vehicle, the required load of the internal combustion engine 1 is increased by means of an electric motor, etc. In addition, the air fuel ratio of the exhaust gas can be made equal to or less than the stoichiometric air fuel ratio, for example, by decreasing a target air fuel ratio of the internal combustion engine 1. Here, note that by carrying out the dither control in which the target air fuel ratio of the internal combustion engine 1 is alternately changed between a rich air fuel ratio and a lean air fuel ratio in a plurality of times, or by extending the period of time of a rich air fuel ratio in the case of making the air fuel ratio to the rich air fuel ratio after the fuel cut of the internal combustion engine 1, etc., the air fuel ratio of the exhaust gas flowing into the three-way catalyst 3 can be made equal to or less than the stoichiometric air fuel ratio, so that sulfur poisoning recovery control may be carried out at this time. Here, note that a large amount of fuel is consumed when carrying out the sulfur poisoning recovery control, it should be suppressed to carry out sulfur poisoning recovery control more than necessary.

In addition, the ECU 10 determines whether the three-way catalyst 3 has deteriorated. In cases where the oxygen storage ability or capacity of the three-way catalyst 3 becomes lower than an allowable range, the ECU 10 makes a determination that the three-way catalyst 3 has deteriorated. The deterioration referred to herein is thermal deterioration which can not be recovered. In this embodiment, it is determined by the use of a Cmax method whether the three-way catalyst 3 has deteriorated. In this case, in cases where the maximum storage amount of oxygen in the three-way catalyst 3 becomes smaller than a storage amount threshold value, a determination is made that the three-way catalyst 3 has deteriorated. Here, the maximum storage amount of oxygen in the three-way catalyst 3 is related to a period of time and an air fuel ratio of exhaust gas, from the time when the air fuel ratio of the exhaust gas flowing into the three-way catalyst 3 has changed from a rich air fuel ratio to a lean air fuel ratio until the time when the air fuel ratio of the exhaust gas flowing out of the three-way catalyst 3 changes to a lean air fuel ratio. Similarly, the maximum storage amount of oxygen in the three-way catalyst 3 is also related to a period of time and an air fuel ratio of exhaust gas, from the time when the air fuel ratio of the exhaust gas flowing into the three-way catalyst 3 has changed from a lean air fuel ratio to a rich air fuel ratio until the time when the air fuel ratio of the exhaust gas flowing out of the three-way catalyst 3 changes to a rich air fuel ratio. Accordingly, the maximum storage amount of oxygen in the three-way catalyst 3 can be calculated based on these periods of time and air fuel ratios. Thus, the degree of deterioration of the three-way catalyst 3 can be determined based on this maximum storage amount of oxygen.

Figure 2:
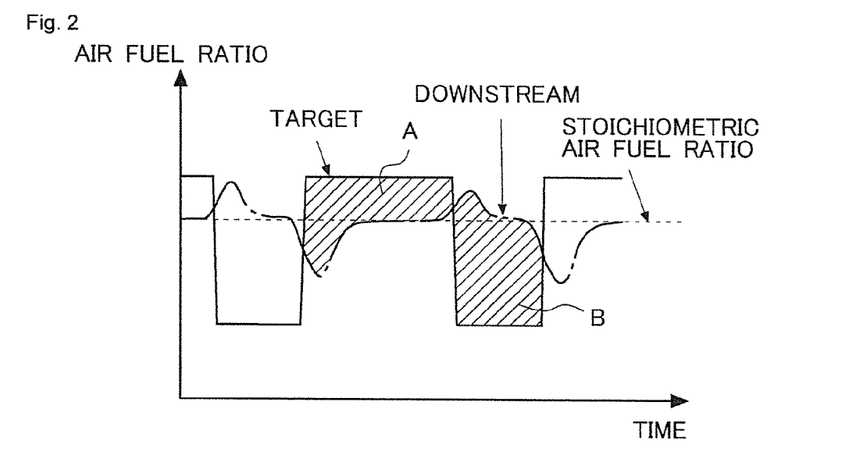
FIG. 2 is a view showing the changes over time of a target air fuel ratio and an air fuel ratio at a location downstream of a three-way catalyst.

For example, the maximum storage amount of oxygen can be calculated according to the Cmax method, based on FIG. 2. Here, FIG. 2 is a view showing the changes over time of a target air fuel ratio (a solid line) and an air fuel ratio at a location downstream of the three-way catalyst 3 (an alternate long and short dash line). The target air fuel ratio is a target air fuel ratio in a cylinder of the internal combustion engine 1. Here, note that the target air fuel ratio may also be replaced with an air fuel ratio of the exhaust gas at a location upstream of the three-way catalyst 3. When the maximum storage amount of oxygen is calculated according to the Cmax method, active control is carried out. Here, note that in this embodiment, the active control corresponds to air fuel ratio control in the present invention. In the active control, when the air fuel ratio of the exhaust gas at a location downstream of the three-way catalyst 3, i.e., the air fuel ratio detected by the second air fuel ratio sensor 12, changes from a rich air fuel ratio to a lean air fuel ratio, the target air fuel ratio is switched to a rich air fuel ratio, whereas when the air fuel ratio detected by the second air fuel ratio sensor 12 changes from a lean air fuel ratio to a rich air fuel ratio, the target air fuel ratio is changed to a lean air fuel ratio. Here, note that in the case where the second air fuel ratio sensor 12 is an electromotive force type (concentration cell type) oxygen concentration sensor (O2 sensor), the target air fuel ratio is switched from a lean air fuel ratio to a rich air fuel ratio, immediately after the air fuel ratio detected by the second air fuel ratio sensor 12 has changed from a rich air fuel ratio to a lean air fuel ratio. On the other hand, in the case where the second air fuel ratio sensor 12 is a limiting current type oxygen concentration sensor, the target air fuel ratio may be switched at the time when the air fuel ratio detected by the second air fuel ratio sensor 12 has become a predetermined lean air fuel ratio. That is, even if the detected air fuel ratio has become a lean air fuel ratio, the target air fuel ratio is not soon switched to a rich air fuel ratio, but the target air fuel ratio may be switched after the detected air fuel ratio has been maintained in a state of a lean air fuel ratio. This is because even in cases where oxygen is released from the three-way catalyst 3, the air fuel ratio of the exhaust gas flowing out of the three-way catalyst 3 may deviate strictly from the stoichiometric air fuel ratio, and so, in such a case, the air fuel ratio should not be switched.

In FIG. 2, the area of a range (hatched range) surrounded by a line indicating the target air fuel ratio and a line indicating the air fuel ratio downstream of the three-way catalyst 3 is proportional to the maximum storage amount of oxygen in the three-way catalyst 3. Accordingly, if the relation between this area and the maximum storage amount of oxygen has been obtained in advance through experiments, simulations, or the like, it is possible to obtain the maximum storage amount of oxygen based on the area. Based on an area A of the range at the time when the target air fuel ratio is a lean air fuel ratio, the maximum storage amount of oxygen may be obtained, or based on an area B of the range at the time when the target air fuel ratio is a rich air fuel ratio, the maximum storage amount of oxygen may also be obtained, or based on an average value between the area A at the time of the target air fuel ratio being a lean air fuel ratio and the area B at the time of the target air fuel ratio being a rich air fuel ratio, the maximum storage amount of oxygen may also be obtained. Here, although the maximum storage amount of oxygen decreases due to the deterioration of the three-way catalyst 3, the maximum storage amount of oxygen is also affected by the influence of sulfur poisoning.

That is, in the case of obtaining the maximum storage amount of oxygen as mentioned above, the maximum storage amount of oxygen in the three-way catalyst 3 decreases apparently according to the degree of sulfur poisoning of the three-way catalyst 3. For this reason, when the determination of the deterioration of the three-way catalyst 3 is carried out based on the maximum storage amount of oxygen in the case of the degree of sulfur poisoning is high, the accuracy of the determination of the deterioration may become low. On the other hand, the sulfur poisoning can be recovered by carrying out sulfur poisoning recovery control, but when sulfur poisoning recovery control is carried out more than necessary, fuel economy may deteriorate, or the thermal deterioration of the three-way catalyst 3 may progress.

Accordingly, the ECU 10 detects the sulfur poisoning of the three-way catalyst 3. Here, a comparison in the concentration of NOx at the location downstream of the three-way catalyst 3 is made between the case where an exhaust gas containing a high concentration of sulfur components is made to circulate to the three-way catalyst 3 in which thermal deterioration has not occurred (hereinafter, also referred to as a normal catalyst) and the degree of sulfur poisoning of the three-way catalyst 3 is high, and the case where an exhaust gas containing a low concentration of sulfur components is made to circulate to the three-way catalyst 3 in which thermal deterioration has occurred (hereinafter, also referred to as an abnormal catalyst) and the degree of sulfur poisoning of the three-way catalyst 3 is low. The normal catalyst has its degree of deterioration within an allowable range, and the abnormal catalyst has its degree of deterioration in excess of the allowable range. In addition, the case where the degree of sulfur poisoning is high is a case where the degree of sulfur poisoning is in excess of the allowable range, and the case where the degree of sulfur poisoning is low is a case where the degree of sulfur poisoning is within the allowable range (the same applies to the following).

Figure 3A:
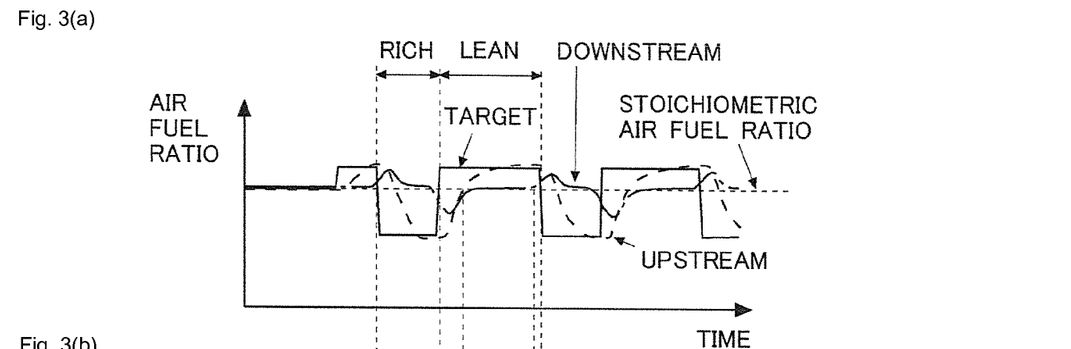
FIG. 3(a) is a view showing the change of an air fuel ratio in the case where an exhaust gas with a high concentration of sulfur components is circulated to a normal catalyst, and in the case where the degree of sulfur poisoning is high.
Figure 3B:
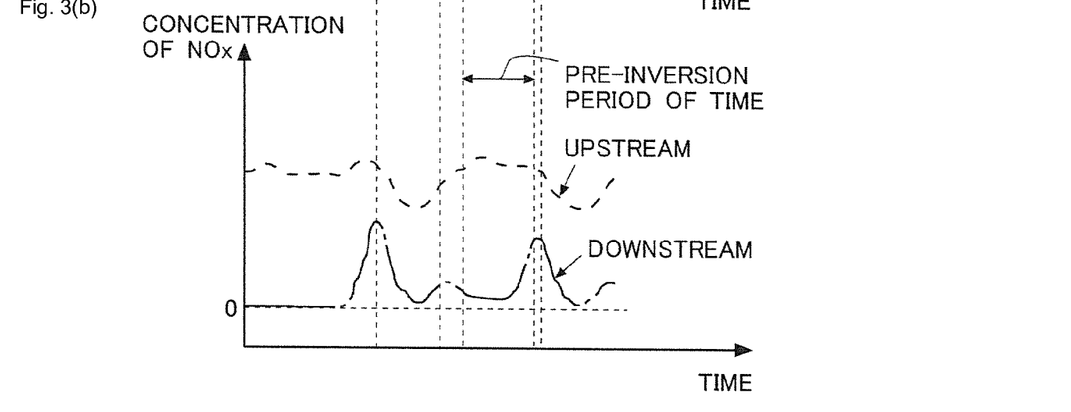
FIG. 3(b) is a view showing the change of the concentration of NOx in the case where an exhaust gas with a high concentration of sulfur components is circulated to a normal catalyst, and in the case where the degree of sulfur poisoning is high.

FIG. 3(a) is a view showing the change of an air fuel ratio in the case where an exhaust gas with a high concentration of sulfur components is circulated to a normal catalyst, and in the case where the degree of sulfur poisoning is high, and FIG. 3(b) is a view showing the change of the concentration of NOx in the same period as in FIG. 3(a). A "TARGET" indicated by a solid line in FIG. 3(a) is the target air fuel ratio in the internal combustion engine 1. In addition, "UPSTREAM"'s indicated by broken lines in FIG. 3 represent the air fuel ratio of exhaust gas and the concentration of NOx therein upstream of the three-way catalyst 3, respectively. Moreover, "DOWNSTREAM"'s indicated by alternate long and short dash lines represent the air fuel ratio of the exhaust gas and the concentration of NOx downstream of the three-way catalyst 3, respectively.

In FIG. 3(a), even in cases where the air fuel ratio of the exhaust gas flowing into the three-way catalyst 3 has changed from a lean air fuel ratio to a rich air fuel ratio, the air fuel ratio of the exhaust gas flowing out of the three-way catalyst 3 does not soon change to a rich air fuel ratio. That is, even if the air fuel ratio of the exhaust gas flowing into the three-way catalyst 3 has changed from a lean air fuel ratio to a rich air fuel ratio, the oxygen stored in the three-way catalyst 3 is released, whereby the air fuel ratio of the exhaust gas flowing out of the three-way catalyst 3 temporarily becomes the stoichiometric air fuel ratio. Then, after the oxygen stored in the three-way catalyst 3 has been released to some extent, the air fuel ratio of the exhaust gas flowing out of the three-way catalyst 3 changes to a rich air fuel ratio. On the contrary, even in cases where the air fuel ratio of the exhaust gas flowing into the three-way catalyst 3 has changed from a rich air fuel ratio to a lean air fuel ratio, oxygen is stored in the three-way catalyst 3, after which the air fuel ratio of the exhaust gas flowing out of the three-way catalyst 3 changes to a lean air fuel ratio.

Here, as shown in FIG. 3(b), in cases where the three-way catalyst 3 is a normal catalyst and the degree of sulfur poisoning thereof is high, the concentration of NOx in the exhaust gas flowing out of the three-way catalyst 3 becomes higher than 0, at the time after the air fuel ratio of the exhaust gas flowing into the three-way catalyst 3 has changed from a rich air fuel ratio to a lean air fuel ratio, and before the air fuel ratio of the exhaust gas flowing out of the three-way catalyst 3 changes to a lean air fuel ratio. Here, note that the period of time after the air fuel ratio of the exhaust gas flowing into the three-way catalyst 3 has changed from a rich air fuel ratio to a lean air fuel ratio, and before the air fuel ratio of the exhaust gas flowing out of the three-way catalyst 3 changes to a lean air fuel ratio is hereinafter referred to as a pre-inversion period of time.

Here, it is considered that when oxygen is released from an oxygen storage agent of the three-way catalyst 3, it is released through a precious or noble metal, and hence, it is considered that when sulfur components have adhered to active spots of the precious metal, oxygen becomes difficult to be released therethrough. Accordingly, the more the active spots to which the sulfur components have adhered, the lower becomes the release speed of oxygen from the oxygen storage agent. When an exhaust gas of a rich air fuel ratio flows into the three-way catalyst 3, first of all, oxygen is released from the oxygen storage agent at the upstream end side of the three-way catalyst 3. However, when the release speed of oxygen from the oxygen storage agent is slow at the time oxygen at the upstream end side of the three-way catalyst 3 is consumed to some extent, the oxygen released at the upstream end side of the three-way catalyst 3 becomes short with respect to HC or CO flowing thereinto, so that it becomes impossible to oxidize HC or CO to a sufficient extent. For this reason, even if oxygen remains at the upstream end side of the three-way catalyst 3, HC and/or CO passes through the upstream end side of the three-way catalyst 3, and arrives at the downstream end side thereof. Similarly, at the downstream end side of the three-way catalyst 3, when the release speed of oxygen from the oxygen storage agent is slow at the time oxygen at the downstream end side of the three-way catalyst 3 is consumed to some extent, the oxygen released at the downstream end side of the three-way catalyst 3 becomes short with respect to HC or CO flowing thereinto, so that it becomes impossible to oxidize HC or CO to a sufficient extent. For this reason, even if oxygen remains at the downstream end side of the three-way catalyst 3, HC and/or CO passes through the downstream end side of the three-way catalyst 3, and flows out of the three-way catalyst 3. As a result, the timing at which HC or CO passes through the three-way catalyst 3 becomes early, and a period of time taken until a rich air fuel ratio is detected at the downstream side of the three-way catalyst 3 becomes short. That is, when the release speed of oxygen from the oxygen storage agent becomes low, in cases where the air fuel ratio of the exhaust gas flowing into the three-way catalyst 3 has changed from a lean air fuel ratio to a rich air fuel ratio, a period of time taken until the air fuel ratio of the exhaust gas flowing out of the three-way catalyst 3 changes to a rich air fuel ratio becomes short. For this reason, the above-mentioned area B becomes small, so the maximum storage amount of oxygen calculated by the use of the Cmax method becomes apparently small.

In addition, when the air fuel ratio of the exhaust gas flowing out of the three-way catalyst 3 becomes a rich air fuel ratio, the air fuel ratio of the exhaust gas flowing into the three-way catalyst 3 is made to change from a rich air fuel ratio to a lean air fuel ratio. At this time, the release speed of oxygen from the oxygen storage agent at the time when the air fuel ratio of the exhaust gas flowing into the three-way catalyst 3 is a rich air fuel ratio is slow, so the air fuel ratio of the exhaust gas has switched in a state where a large amount of oxygen has remained in the three-way catalyst 3. That is, in the case where the sulfur components have adhered to the active spots of the precious metal, the air fuel ratio of the exhaust gas flowing into the three-way catalyst 3 switches to a lean air fuel ratio in a state where oxygen has not fully been released, when the air fuel ratio of the exhaust gas flowing into the three-way catalyst 3 is a rich air fuel ratio, as mentioned above. Then, when the air fuel ratio of the exhaust gas, which flows into the three-way catalyst 3 in the state where a relatively large amount of oxygen remains in the three-way catalyst 3, becomes a lean air fuel ratio, a period of time taken until the amount of stored oxygen in the three-way catalyst 3 will be saturated becomes short. For this reason, the timing at which oxygen passes through the three-way catalyst 3 becomes early, and a period of time taken until a lean air fuel ratio is detected at the downstream side of the three-way catalyst 3 becomes short. Accordingly, the above-mentioned area A becomes small, so the maximum storage amount of oxygen calculated by the use of the Cmax method becomes apparently small.

It is considered that the reason why the concentration of NOx in the exhaust gas flowing out of the three-way catalyst 3 becomes higher than 0 in the pre-inversion period of time is that the reduction of NOx becomes difficult due to the adhesion or attachment of sulfur components to the active spots of the precious metal (e.g., RH or Pd) of the three-way catalyst 3. Here, note that when fuel with a high concentration of sulfur components is used, sulfur poisoning will occur in the oxygen storage agent (e.g., ceria) of the three-way catalyst 3, but it is considered that at the time of a rich air fuel ratio, the sulfur components move from the oxygen storage agent side to the precious metal side. For this reason, the sulfur poisoning of the precious metal, which serves to reduce NOx, becomes more remarkable. That is, the decrease of the NOx removal or reduction rate becomes remarkable.

Figure 4A:
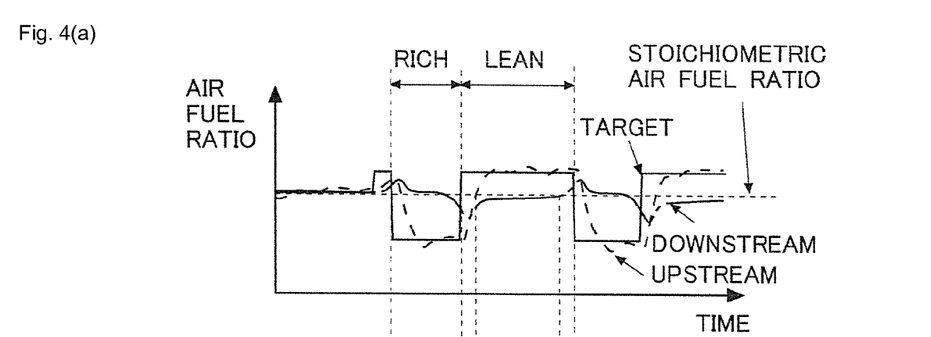
FIG. 4(a) is a view showing the change of an air fuel ratio in the case where an exhaust gas with a low concentration of sulfur components is circulated to an abnormal catalyst, and in the case where the degree of sulfur poisoning is low.
Figure 4B:
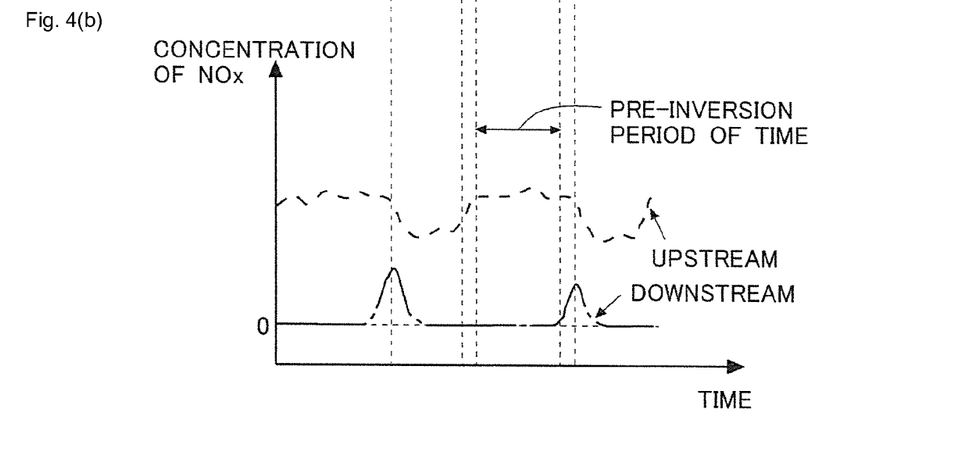
FIG. 4(b) is a view showing the change of the concentration of NOx in the case where an exhaust gas with a low concentration of sulfur components is circulated to an abnormal catalyst, and in the case where the degree of sulfur poisoning is low.

On the other hand, FIG. 4(a) is a view showing the change of an air fuel ratio in the case where an exhaust gas with a low concentration of sulfur components is circulated to an abnormal catalyst, and in the case where the degree of sulfur poisoning is low, and FIG. 4(b) is a view showing the change of the concentration of NOx in the same period as in FIG. 4(a). Even in the case of the abnormal catalyst, if the degree of sulfur poisoning thereof is low, the concentration of NOx in the exhaust gas flowing out of the three-way catalyst 3 will become substantially zero, in the pre-inversion period of time. Here, in the abnormal catalyst, the higher the degree of deterioration thereof, the smaller becomes the maximum storage amount of oxygen therein, so the shorter becomes the pre-inversion period of time. That is, a period of time in which the air fuel ratio of the exhaust gas flowing out of the three-way catalyst 3 becomes the stoichiometric air fuel ratio becomes short. In this manner, though the period of time in which the air fuel ratio of the exhaust gas flowing out of the three-way catalyst 3 becomes the stoichiometric air fuel ratio becomes short, if the degree of sulfur poisoning is low, NOx will be removed or reduced by means of the precious metal of the three-way catalyst 3 when the exhaust gas flowing out of the three-way catalyst 3 is at the stoichiometric air fuel ratio. That is, even with the abnormal catalyst, in the case where the degree of sulfur poisoning thereof is low, the reduction of NOx can be made when the air fuel ratio of the exhaust gas flowing out of the three-way catalyst 3 becomes the stoichiometric air fuel ratio.

In this manner, comparing the case where the three-way catalyst 3 is a normal catalyst and the degree of sulfur poisoning thereof is high (i.e., in the case of FIG. 3), with the case where the three-way catalyst 3 is an abnormal catalyst and the degree of sulfur poisoning thereof is high (i.e., in the case of FIG. 4), when the air fuel ratio of the exhaust gas flowing out of the three-way catalyst 3 becomes the stoichiometric air fuel ratio, the concentration of NOx in the exhaust gas flowing out of the three-way catalyst 3 becomes higher in the normal catalyst than in the abnormal catalyst. This is due to the influence of the sulfur poisoning of the three-way catalyst 3, as mentioned above. Here, note that even in the case of the three-way catalyst 3 being a normal catalyst or an abnormal catalyst, when the degree of sulfur poisoning thereof is high, the NOx purification (removal and/or reduction) performance of the three-way catalyst 3 at the time when the air fuel ratio of the exhaust gas flowing out of the three-way catalyst 3 is the stoichiometric air fuel ratio becomes low, and so the concentration of NOx in the exhaust gas becomes high. That is, it can be considered that in cases where the concentration of NOx in the pre-inversion period of time is high, the degree of sulfur poisoning of the three-way catalyst 3 is high. On the other hand, even in the case of the three-way catalyst 3 being a normal catalyst or an abnormal catalyst, when the degree of sulfur poisoning thereof is low, the NOx purification (removal and/or reduction) performance of the three-way catalyst 3 at the time when the air fuel ratio of the exhaust gas flowing out of the three-way catalyst 3 is the stoichiometric air fuel ratio is high, and so the concentration of NOx in the exhaust gas becomes low. That is, it can be considered that in cases where the concentration of NOx in the pre-inversion period of time is low, the degree of sulfur poisoning of the three-way catalyst 3 is low. In this manner, the degree of sulfur poisoning can be detected irrespective of whether the three-way catalyst 3 is a normal catalyst or an abnormal catalyst. Accordingly, in this embodiment, based on the concentration of NOx in the exhaust gas flowing out of the three-way catalyst 3 in the pre-inversion period of time, it is determined whether the degree of sulfur poisoning of the three-way catalyst 3 is high. Moreover, in cases where a determination is made that the degree of sulfur poisoning of the three-way catalyst 3 is high, sulfur poisoning recovery control is carried out. Here, note that, without determining whether the degree of sulfur poisoning of the three-way catalyst 3 is high, it may be directly determined, based on the concentration of NOx in the exhaust gas flowing out of the three-way catalyst 3 in the pre-inversion period of time, whether sulfur poisoning recovery control is to be carried out. Then, by carrying out the determination of the deterioration of the three-way catalyst 3 after performing sulfur poisoning recovery control, the deterioration determination of the three-way catalyst 3 can be carried out without being affected by the influence of the sulfur poisoning thereof. As a result, the accuracy of the deterioration determination can be enhanced.

Figure 5:
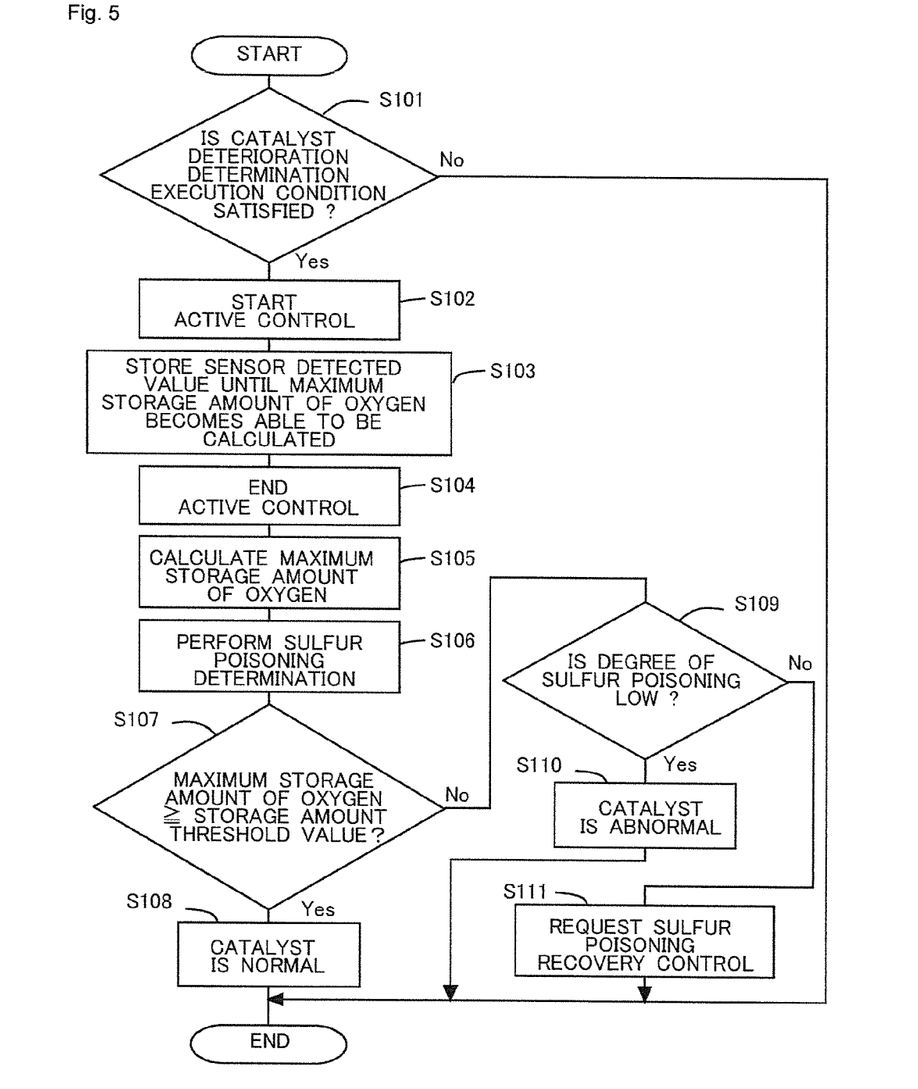
FIG. 5 is a flow chart showing a flow for the determination of deterioration of the three-way catalyst.

FIG. 5 is a flow chart showing a flow or routine for the determination of deterioration of the three-way catalyst 3. This flow or routine is carried out by means of the ECU 10 at each predetermined time interval.

In step S101, it is determined whether a catalyst deterioration determination execution condition is satisfied. The catalyst deterioration determination execution condition is a condition which decides whether the determination of the deterioration of the three-way catalyst 3 is to be carried out. For example, when the temperature of the three-way catalyst 3 is within a predetermined temperature range and the amount of intake air in the internal combustion engine 1 is within a predetermined intake air amount range, a determination is made that the catalyst deterioration determination execution condition is satisfied. The predetermined temperature range and the predetermined intake air amount range are related to the accuracy of the deterioration determination and the frequency (the number of times) at which the deterioration determination is carried out, so they are decided in such a manner that the accuracy and the frequency fall within allowable ranges, respectively. In cases where an affirmative determination is made in step S101, the routine goes to step S102, whereas in cases where a negative determination is made, this routine is ended.

In step S102, active control is started. That is, based on the detected value of the second air fuel ratio sensor 12, the air fuel ratio of the exhaust gas flowing into the three-way catalyst 3 is switched between a rich air fuel ratio and a lean air fuel ratio in an alternate manner. Here, note that in this embodiment, the ECU 10, which carries out active control, corresponds to an air fuel ratio control unit in the present invention.

In step S103, the detected values of the sensors are stored in the ECU 10 until it becomes possible to calculate the maximum storage amount of oxygen. In combination with this, the target air fuel ratio is also stored in the ECU 10. The detected values of the sensors referred to herein are those including the detected values of the second air fuel ratio sensor 12 and the NOx sensor 13. In order to calculate the maximum storage amount of oxygen, it is necessary to obtain the areas indicated by A and B in FIG. 2. Accordingly, the detected values of the sensors are stored at least until the target air fuel ratio begins from a rich air fuel ratio, and then switches in order of a lean air fuel ratio, a rich air fuel ratio, and a lean air fuel ratio, or begins from a lean air fuel ratio, and then switches in order of a rich air fuel ratio, a lean air fuel ratio, and a rich air fuel ratio. In addition, the air fuel ratio also passes through the pre-inversion period of time in the course of changing in this manner, and so, based on the concentration of NOx stored at this time, there can be determined the degree of sulfur poisoning of the three-way catalyst 3. That is, in this step, the detected values of the sensors are stored which are required for the calculation of the maximum storage amount of oxygen and the calculation of the degree of sulfur poisoning of the three-way catalyst 3.

In step S104, the active control is ended. When the active control is ended, thereafter, the target air fuel ratio is decided based on the operating state of the internal combustion engine 1, etc.

In step S105, the maximum amount of oxygen in the three-way catalyst 3 is calculated. The maximum storage amount of oxygen in the three-way catalyst 3 is calculated according to the above-mentioned Cmax method. The ECU 10 calculates the maximum storage amount of oxygen based on the target air fuel ratio and the detected value of the second air fuel ratio sensor 12 stored in step S103.

In step S106, the determination of sulfur poisoning is carried out. The determination of sulfur poisoning will be described later.

In step S107, it is determined whether the maximum amount of oxygen in the three-way catalyst 3 calculated in step S105 is equal to or more than the storage amount threshold value. In this step S107, it is determined whether the maximum amount of oxygen in the three-way catalyst 3 becomes equal to or more than a value which indicates that the three-way catalyst 3 is normal, i.e., whether the three-way catalyst 3 has deteriorated or not. For this reason, the storage amount threshold value is set as a lower limit value of the maximum storage amount of oxygen at the time when the three-way catalyst 3 is normal. This storage amount threshold value has been obtained through experiments, simulations or the like in advance. Here, note that in this embodiment, the ECU 10, which carries out the processing of step S107 onward, corresponds to a determination unit in the present invention.

In cases where an affirmative determination is made in step S107, the routine advances to step S108, in which a determination is made that the three-way catalyst 3 is normal. That is, the determination is made that the thermal deterioration of the three-way catalyst 3 is within the allowable range. When the processing of step S107 ends, this routine is ended.

On the other hand, in cases where a negative determination is made in step S107, the routine goes to step S109, where it is determined whether the degree of sulfur poisoning of the three-way catalyst 3 is low. In step S109, it is determined whether the degree of sulfur poisoning of the three-way catalyst 3 is within an allowable range for determining the deterioration of the three-way catalyst 3. Whether the degree of sulfur poisoning is low (within the allowable range) or high (in excess of the allowable range) is obtained in step S106.

In cases where an affirmative determination is made in step S109, the routine advances to step S110, in which a determination is made that the three-way catalyst 3 is abnormal. That is, the influence of the sulfur poisoning on the maximum storage amount of oxygen is small, so it can be considered that the reason why the maximum storage amount of oxygen is small is that thermal deterioration has occurred in the three-way catalyst 3. Thereafter, this flow or routine is ended.

On the other hand, in cases where a negative determination is made in step S109, the routine advances to step S111, where sulfur poisoning recovery control is requested. That is, because the degree of sulfur poisoning of the three-way catalyst 3 is in a high state, the accuracy of the deterioration determination becomes low, so in this state, the deterioration determination is not carried out. As a result of this, it is possible to suppress a reduction in the accuracy of the deterioration determination. In cases where sulfur poisoning recovery control is requested and other conditions for carrying out sulfur poisoning recovery control are satisfied, the sulfur poisoning recovery control is separately carried out by means of the ECU 10. Then, when this flow or routine is again carried out after the sulfur poisoning of the three-way catalyst 3 has been recovered, the determination of the deterioration of the three-way catalyst 3 can be carried out in a state where the degree of sulfur poisoning of the three-way catalyst 3 is low.

Figure 6:
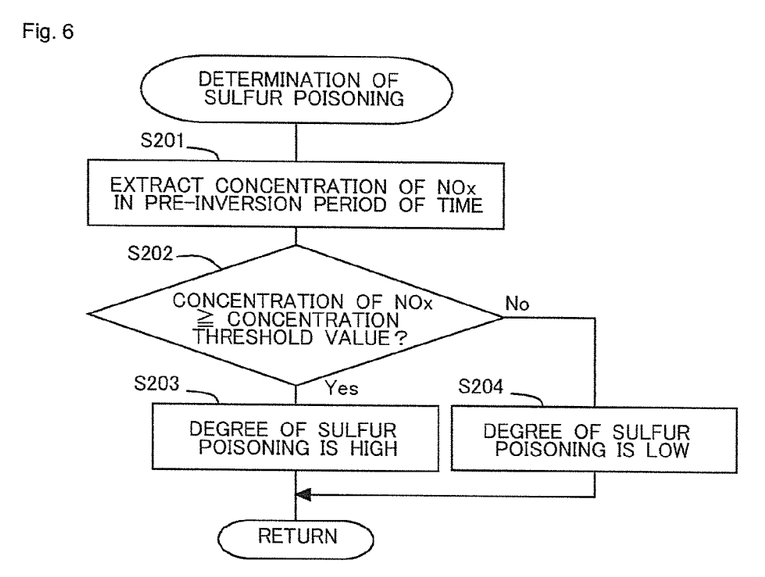
FIG. 6 is a flow chart showing a flow for the determination of sulfur poisoning of the three-way catalyst.

Next, the sulfur poisoning determination carried out in step S106 will be explained. FIG. 6 is a flow chart showing a flow or routine for the determination of sulfur poisoning of the three-way catalyst 3. This flow or routine is carried out in step S106 by means of the ECU 10. Here, note that in this embodiment, the ECU 10, which carries out this flow or routine, corresponds to the determination unit in the present invention.

In step S201, a concentration of NOx in the pre-inversion period of time is extracted from among the concentrations of NOx stored in step S103. In this step, any of a maximum value, a minimum value, an average value, or an integrated value of the concentration of NOx in the pre-inversion period of time may be extracted as the concentration of NOx. In addition, instead of these values, a concentration of NOx at a predetermined time within the pre-inversion period of time may be extracted. The predetermined time may be, for example, a point in time at which a predetermined period of time has elapsed, after the target air fuel ratio changes from a rich air fuel ratio to a lean air fuel ratio.

In step S202, it is determined whether the concentration of NOx detected in step S201 is equal to or more than a concentration threshold value. This concentration threshold value is set as a concentration of NOx at which the degree of sulfur poisoning of the three-way catalyst 3 exceeds or may exceed an allowable range for carrying out the determination of deterioration of the three-way catalyst 3. The concentration threshold value can be obtained in advance through experiments, simulations, or the like. In cases where an affirmative determination is made in step S202, the routine goes to step S203, where a determination is made that the degree of sulfur poisoning of the three-way catalyst 3 is high. Here, note that in step S203, a determination may be made that the degree of poisoning or poisoning level of the three-way catalyst 3 is equal to or more than a poisoning threshold value. The poisoning threshold value can be made to a degree of sulfur poisoning at the time when the degree of sulfur poisoning of the three-way catalyst 3 exceeds the allowable range, or at the time when the degree of sulfur poisoning of the three-way catalyst 3 may exceed the allowable range. In addition, in step S203, a determination may be made that sulfur poisoning recovery control is to be carried out. On the other hand, in cases where a negative determination is made in step S202, the routine goes to step S204, where a determination is made that the degree of sulfur poisoning of the three-way catalyst 3 is low. Note that in step S204, a determination may be made that the degree of poisoning or poisoning level of the three-way catalyst 3 is less than the poisoning threshold value. In addition, in step S204, a determination may be made that it is not necessary to carry out sulfur poisoning recovery control. When the processing of step S203 or step S204 is completed, a return is made to the flow or routine shown in FIG. 5, where the routine goes to step S107. Note that when a determination is made in step S203 that the degree of sulfur poisoning of the three-way catalyst 3 is high, poisoning recovery control may be carried out. In that case, active control is carried out anew.

As described above, according to this embodiment, based on the concentration of NOx in the exhaust gas flowing out of the three-way catalyst 3 in the pre-inversion period of time, it can be determined whether the degree of sulfur poisoning of the three-way catalyst 3 is high. In cases where the degree of sulfur poisoning of the three-way catalyst 3 is high, the sulfur poisoning can be recovered by carrying out sulfur poisoning recovery control, so that the accuracy of the determination of the deterioration of the three-way catalyst 3 can be enhanced. On the other hand, in cases where the degree of sulfur poisoning of the three-way catalyst 3 is low, sulfur poisoning recovery control is not carried out more than necessary, thus making it possible to suppress the deterioration in fuel economy.

Here, note that in this embodiment, it is also possible to calculate the poisoning level of the three-way catalyst 3. The poisoning level of the three-way catalyst 3 is a numerical value indicating the degree of sulfur poisoning, and for example, is a value which indicates the ratio of poisoned active spots among all the active spots of the three-way catalyst 3. This poisoning level is associated with the concentration of NOx in the exhaust gas flowing out of the three-way catalyst 3 in the pre-inversion period of time. That is, the higher the poisoning level of the three-way catalyst 3, the lower becomes the NOx reduction performance thereof, and hence, the higher becomes the concentration of NOx in the exhaust gas flowing out of the three-way catalyst 3. Accordingly, if the relation between the concentration of NOx and the poisoning level of the three-way catalyst 3 has been obtained in advance through experiments, simulations, or the like, it is possible to obtain the poisoning level based on the concentration of NOx. In addition, a determination can be made that the higher the concentration of NOx in the exhaust gas flowing out of the three-way catalyst 3, the higher is the poisoning level of the three-way catalyst 3.

Here, note that the concentration of NOx in the exhaust gas flowing out of the three-way catalyst 3 may change due to the concentration of NOx in the exhaust gas flowing into the three-way catalyst 3, and hence, a determination may be made that the higher the ratio of the concentration of NOx in the exhaust gas flowing out of the three-way catalyst 3 with respect to the concentration of NOx in the exhaust gas flowing into the three-way catalyst 3, the higher is the poisoning level of the three-way catalyst 3. This relation can also be obtained in advance through experiments, simulations, or the like.

The poisoning level of the three-way catalyst 3 can be calculated based on the concentration of NOx extracted in step S201. For example, through experiments, simulations or the like, there has been stored in advance in the ECU 10 a map in which the higher the concentration of NOx, the higher becomes the poisoning level of the three-way catalyst 3. Then, the poisoning level of the three-way catalyst 3 is calculated from the concentration of NOx detected by the NOx sensor 13, and a map.

Further, in this embodiment, the amount of sulfur poisoning of the three-way catalyst 3 can also be obtained based on the poisoning level thereof. The amount of sulfur poisoning is the mass of the sulfur components that have been accumulated in the three-way catalyst 3. Here, even if the poisoning level of the three-way catalyst 3 is the same, the amount of sulfur poisoning thereof changes with the amount of the precious metal in the three-way catalyst 3. Here, note that the amount of precious metal can be known in advance. The amount of sulfur poisoning of the three-way catalyst 3 is proportional to the poisoning level thereof, and hence, for example, if a proportionality coefficient has been obtained in advance, the amount of sulfur poisoning can be obtained by multiplying the proportionality coefficient to the poisoning level. In addition, the amount of sulfur poisoning can also be obtained directly based on the concentration of NOx in the exhaust gas flowing out of the three-way catalyst 3. Here, note that the higher the concentration of NOx in the exhaust gas flowing out of the three-way catalyst 3, the larger becomes the amount of sulfur poisoning.

Here, note that in cases where a determination has been made that the degree of sulfur poisoning of the three-way catalyst 3 is high, in this embodiment, sulfur poisoning recovery control is carried out, in order to enhance the accuracy of the determination of the deterioration of the three-way catalyst 3, but instead of this, the determination of the deterioration of the three-way catalyst 3 may be inhibited. That is, only in the case where a determination is made that the degree of sulfur poisoning of the three-way catalyst 3 is low, the determination of the deterioration of the three-way catalyst 3 may be carried out. In this case, too, it is possible to suppress a reduction in the accuracy of the deterioration determination.

In addition, in the case where a determination is made that the degree of sulfur poisoning of the three-way catalyst 3 is high, the catalyst deterioration determination execution condition in step S101 may be changed, instead of carrying out sulfur poisoning recovery control. For example, the determination of the deterioration of the three-way catalyst 3 is carried out when the temperature of the three-way catalyst 3 is within the predetermined temperature range and the amount of intake air in the internal combustion engine 1 is within the predetermined intake air amount range. Here, the accuracy of the deterioration determination becomes higher in the case where the temperature of the three-way catalyst 3 is high than in the opposite case, but if the deterioration determination is carried out only in cases where the temperature of the three-way catalyst 3 is higher than a prescribed temperature, the temperature of the three-way catalyst 3 may not go up to the prescribed temperature, depending on the operating state of the internal combustion engine 1. Even in such a state, a lower limit value of the predetermined temperature range in which the deterioration determination is carried out may be set relatively low, so that the determination of the deterioration of the three-way catalyst 3 can be carried out. However, if the deterioration determination is carried out when the degree of sulfur poisoning of the three-way catalyst 3 is high, the accuracy of the determination will become low. In contrast to this, if the lower limit value of the predetermined temperature range is changed to become large when the degree of sulfur poisoning is high, it will be able to suppress the deterioration determination from being carried out at the time of a low temperature at which the accuracy of the deterioration determination becomes low. As a result of this, it is possible to suppress a reduction in the accuracy of the deterioration determination.

Moreover, even if sulfur poisoning recovery control is not carried out, when the temperature of the three-way catalyst 3 becomes high, the influence of the sulfur poisoning of the three-way catalyst 3 becomes small in the deterioration determination, and so, the deterioration determination may be carried out, after the three-way catalyst 3 has become a predetermined high temperature.

Further, in cases where the degree of sulfur poisoning of the three-way catalyst 3 is high, the user may be notified of the fact that the degree of sulfur poisoning is high, or the user may be notified or prompted to replace fuel with one containing a high concentration of sulfur components. Moreover, in cases where an NSR catalyst is provided at the downstream side of the three-way catalyst 3, the sulfur poisoning recovery control of the NSR catalyst may be carried out when a determination is made that the degree of sulfur poisoning of the three-way catalyst 3 is high. In this case, by carrying out the sulfur poisoning recovery control of the NSR catalyst, the temperature of the three-way catalyst 3 also goes up, so that the sulfur poisoning of the three-way catalyst 3 can also be recovered.

While the invention has been described in terms of the preferred embodiment, those skilled in the art will recognize that the invention can be practiced with modifications within the spirit and scope of the appended claims.

What is claimed is:

1. An exhaust gas purification apparatus for an internal combustion engine, exhaust gas purification apparatus comprising:
    a three-way catalyst that is arranged in an exhaust passage of the internal combustion engine and has an oxygen storage ability;
    an NOx sensor that is arranged in the exhaust passage at a location downstream of the three-way catalyst, and configured to detect a concentration of NOx in exhaust gas;
    an air fuel ratio sensor that is arranged in the exhaust passage at a location downstream of the three-way catalyst, and configured to detect an air fuel ratio of the exhaust gas; and
    an electronic control unit configured to:
    change the air fuel ratio of the exhaust gas flowing into the three-way catalyst;
    determine a degree of sulfur poisoning based on the concentration of the NOx detected by the NOx sensor after the air fuel ratio of the exhaust gas has been changed from a rich air fuel ratio to a lean air fuel ratio by the electronic control unit and before the air fuel ratio detected by the air fuel ratio sensor changes to a lean air fuel ratio, the degree of sulfur poisoning is determined to be higher when the concentration of NOx detected by the NOx sensor is high compared to the degree of sulfur poisoning when the concentration of NOx detected by the NOx sensor is low;

determine whether the three-way catalyst requires sulfur poisoning recovery based on degree the of sulfur poisoning of the three-way catalyst determined by the electronic control unit; and perform the sulfur poisoning recovery when it has been determined that the three-way catalyst requires sulfur poisoning recovery.

2. The exhaust gas purification apparatus for an internal combustion engine as set forth in claim 1, wherein the electronic control unit is configured to determine that the three-way catalyst requires sulfur poisoning recovery, in cases where the concentration of NOx detected by the NOx sensor is equal to or higher than a concentration threshold value, after the air fuel ratio of the exhaust gas has been changed from a rich air fuel ratio to a lean air fuel ratio by the electronic control unit and before the air fuel ratio detected by the air fuel ratio sensor changes to a lean air fuel ratio.

3. The exhaust gas purification apparatus for an internal combustion engine as set forth in claim 2, wherein the electronic control unit is configured to perform air fuel ratio control in which the air fuel ratio of the exhaust gas flowing into the three-way catalyst is made to a lean air fuel ratio in cases where the air fuel ratio detected by the air fuel ratio sensor is a rich air fuel ratio, whereas the air fuel ratio of the exhaust gas flowing into the three-way catalyst is made to a rich air fuel ratio in cases where the air fuel ratio detected by the air fuel ratio sensor is a lean air fuel ratio;

based on the concentration of NOx detected by the NOx sensor at the time of the air fuel ratio control being performed by the electronic control unit, the electronic control unit is configured to determine whether the three-way catalyst requires sulfur poisoning recovery the degree of sulfur poisoning of the three-way catalyst is determined to be higher when the concentration of NOx detected by the NOx sensor is high compared to the degree of sulfur poisoning when the concentration of NOx detected by the NOx sensor is low;

the electronic control unit is further configured to determine that the three-way catalyst has deteriorated, when a maximum storage amount of oxygen in the three-way catalyst obtained by performing the air fuel ratio control by the electronic control unit is less than a storage amount threshold value, in the case where it has been determined that the three-way catalyst does not require sulfur poisoning recovery of the three-way catalyst, or in the case where it has been determined that the degree of sulfur poisoning of the three-way catalyst is less than a poisoning threshold value.

4. The exhaust gas purification apparatus for an internal combustion engine as set forth in claim 1, wherein the electronic control unit is configured to perform air fuel ratio control in which the air fuel ratio of the exhaust gas flowing into the three-way catalyst is made to a lean air fuel ratio in cases where the air fuel ratio detected by the air fuel ratio sensor is a rich air fuel ratio, whereas the air fuel ratio of the exhaust gas flowing into the three-way catalyst is made to a rich air fuel ratio in cases where the air fuel ratio detected by the air fuel ratio sensor is a lean air fuel ratio;

based on the concentration of NOx detected by the NOx sensor at the time of the air fuel ratio control being performed by the electronic control unit, the electronic control unit is configured to determine whether the three-way catalyst requires sulfur poisoning recovery the degree of sulfur poisoning of the three-way catalyst is determined to be higher when the concentration of NOx detected by the NOx sensor is high compared to the degree of sulfur poisoning when the concentration of NOx detected by the NOx sensor is low;

the electronic control unit is further configured to determine that the three-way catalyst has deteriorated, when a maximum storage amount of oxygen in the three-way catalyst obtained by performing the air fuel ratio control by the electronic control unit is less than a storage amount threshold value, in the case where it has been determined that the three-way catalyst does not require sulfur poisoning recovery of the three-way catalyst, or in the case where it has been determined that the degree of sulfur poisoning of the three-way catalyst is less than a poisoning threshold value.

\* \* \* \* \*